United States Patent
Seng

(10) Patent No.: US 8,419,292 B2
(45) Date of Patent: Apr. 16, 2013

(54) "SECURED" FIBER OPTIC CONNECTING SYSTEM AND METHOD USING DIFFERENT FIBER POSITIONS OF A MULTI-FIBER CONNECTOR

(75) Inventor: Kheng Hwa Seng, Greer, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 153 days.

(21) Appl. No.: 12/746,050

(22) PCT Filed: Dec. 11, 2009

(86) PCT No.: PCT/US2009/067720
§ 371 (c)(1),
(2), (4) Date: Jun. 3, 2010

(87) PCT Pub. No.: WO2010/068896
PCT Pub. Date: Jun. 17, 2010

(65) Prior Publication Data
US 2011/0064361 A1    Mar. 17, 2011

Related U.S. Application Data

(60) Provisional application No. 61/121,733, filed on Dec. 11, 2008.

(51) Int. Cl.
*G02B 6/38* (2006.01)
(52) U.S. Cl.
USPC ................... 385/71; 385/70; 385/72; 385/78; 385/88; 385/92

(58) Field of Classification Search .................... 385/53, 385/55, 70, 71, 72, 78, 88, 92
See application file for complete search history.

(56) References Cited

U.S. PATENT DOCUMENTS

| 4,744,629 | A | 5/1988 | Bertoglio et al. |
|---|---|---|---|
| 5,177,557 | A | 1/1993 | Yamane |
| 5,548,675 | A | 8/1996 | Shigematsu et al. |
| 5,619,604 | A | 4/1997 | Shiflett et al. |
| 5,692,079 | A | 11/1997 | Iso |
| 5,838,856 | A | 11/1998 | Lee |
| 6,129,865 | A | 10/2000 | Jeong et al. |
| 6,336,826 | B1 | 1/2002 | Kraft |
| 7,052,187 | B2 * | 5/2006 | Ohtsuka et al. ............ 385/60 |
| 7,566,175 | B2 | 7/2009 | Scheibenreif et al. |
| 2006/0204179 | A1 * | 9/2006 | Patel et al. ............ 385/59 |
| 2009/0154884 | A1 | 6/2009 | Chen et al. |

FOREIGN PATENT DOCUMENTS

JP          10-10368 A * 1/1998

* cited by examiner

*Primary Examiner* — Jennifer Doan
(74) *Attorney, Agent, or Firm* — Sughrue Mion, PLLC

(57) ABSTRACT

Provided is a multi-fiber connector and a method of providing a secure fiber network, where the multi-fiber connector includes a housing; a multi-position ferrule disposed within the housing, the multi-position ferrule including a plurality of fiber holes arranged in a predetermined pattern; and at least one fiber. Each of the plurality of fiber holes is configured to receive one of the at least one fiber and each fiber is selectively inserted within one of the plurality of fiber holes at a selected position among the plurality of fiber holes. Additionally, only a portion of the plurality of fiber holes are populated with the at least one fiber and a remaining portion of the plurality of fiber holes are not populated with fibers.

18 Claims, 5 Drawing Sheets

"SECURED" FIBER OPTIC CONNECTING SYSTEM AND METHOD USING DIFFERENT FIBER POSITIONS OF A MULTI-FIBER CONNECTOR

CROSS-REFERENCE TO RELATED APPLICATION

This application claims priority U.S. Provisional Application 61/121,733, filed on Dec. 11, 2008, the disclosure of which is incorporated herein by reference in its entirety.

BACKGROUND

1. Field

Apparatuses and methods consistent with the exemplary embodiments relate to a security connecting system, and more particularly, to a security connecting system for providing interconnection between a single pair or multiple pairs of mating optical fibers.

2. Description of the Related Art

Optical fibers find extensive use for transmission of light for digital communications by modulating light signals to convey data or information. The fibers are fragile and have extremely small diameters. Typically, the optical fibers are coupled to a light transmitting device at one end, and light receiving device at the other end. The ends of the fibers may also be coupled in an end-to-end relationship with other mating fibers, and at times multiple optical fibers must be simultaneously coupled. In order to provide reliable coupling and ensure high efficiency in the transfer of light or light signals, it is critical that the ends of the optical fibers be precisely aligned with the ends of other fibers or devices to which they are coupled.

Ferrules are used to provide a mechanically robust mount within a connector for holding optical fibers in a desired position. The ferrule is usually a rigid tube or housing that aligns and protects the stripped end of a fiber. The ferrule may have a one or multiple fiber holes which extend in a through the longitudinal axis of the ferrule and a single fiber is passed through each fiber hole. Such ferrules may be made of metal, plastic glass or ceramic.

There is an increasing need for physical security and identification in a network. One method in the related art is to create physical "keying" features on a connector housing to prevent connection into an adapter unless the adapter too has the complementary "keying" feature. For example, a secured connecting system of the related art may use physical barriers to prevent unauthorized insertion of a connector plug into a connector receptacle in an adapter.

Another secured connecting system of the related art may use physical barriers to prevent unauthorized removal of a connector plug that is already connected to the adapter.

In both cases, the secured connecting systems of the related art require different connector housings with different physical barriers to prevent either unauthorized insertion of a connector plug into the receptacle of an adapter or unauthorized removal of a connector plug from the adapter.

Thus, a security connecting system which eliminates the need to create multiple types of connector housings and adapters to establish physical security in connecting system of a network is needed.

SUMMARY

According to an aspect of an exemplary embodiment, there is provided a multi-fiber connector including a housing; a multi-position ferrule disposed within the housing, the multi-position ferrule including a plurality of fiber holes arranged in a predetermined pattern; and at least one optical fiber. Each of the plurality of fiber holes is configured to receive one of the at least one optical fiber and each optical fiber is selectively inserted within one of the plurality of fiber holes at a selected position among the plurality of fiber holes. To create security in an inter-connection between multi-fiber connectors, only a portion of the plurality of fiber holes are populated with the at least one optical fiber and a remaining portion of the plurality of fiber holes are not populated with fibers.

The multi-fiber connector may include only one optical fiber. Alternatively, the multi-fiber connector may include at least two optical fibers. However, at least one of the plurality of fiber holes is not populated with the at least one optical fiber.

According to an aspect of another exemplary embodiment, there is provided a multi-fiber connector system including a first multi-fiber connector and a second multi-fiber connector.

The first multi-fiber connector includes a housing; a multi-position ferrule disposed within the housing, the multi-position ferrule including a plurality of fiber holes arranged in a predetermined pattern; and at least one optical fiber. Each of the plurality of fiber holes is configured to receive one of the at least one optical fiber and each optical fiber is selectively inserted within one of the plurality of fiber holes at a selected position among the plurality of fiber holes. In addition, only a portion of the plurality of fiber holes are populated with the at least one optical fiber and a remaining portion of the plurality of fiber holes are not populated with fibers.

The second multi-fiber connector includes a housing; a multi-position ferrule disposed within the housing, the multi-position ferrule including a plurality of fiber holes arranged in a predetermined pattern having matching positions corresponding to the predetermined pattern of the first multi-fiber connector; and at least one optical fiber. Each of the plurality of fiber holes is configured to receive one of the at least one optical fiber and each optical fiber is selectively inserted within one of the plurality of fiber holes at a selected position among the plurality of fiber holes. The plurality of fiber holes of the second multi-fiber connector are populated with the at least one optical fiber such that the first multi-fiber connector and the second multi-fiber connector have a matching configuration of populated fiber holes and unpopulated fiber holes.

The multi-fiber connector system may also include an adapter which includes a first receptacle configured to receive the first multi-fiber connector and a second receptacle configured to receive the second multi-fiber connector, such that the at least one optical fiber of the first multi-fiber connector and the at least one optical fiber of the second multi-fiber connector mate in coaxial alignment to effect an interconnection.

According to an aspect of another exemplary embodiment, there is provided a method of connecting multi-fiber connectors in a secure fiber optic network, the method includes selecting at least one fiber hole of a plurality of fiber holes of a first multi-fiber connector to populate with an optical fiber; selecting not to populate at least one fiber hole of the plurality of fiber holes of the first multi-fiber connector with another optical fiber such that only a portion of the plurality of fiber holes of the first multi-fiber connector are populated with at least one optical fiber and a remaining portion of the plurality of fiber holes of the first multi-fiber connector are not populated; inserting the at least one optical fiber in only the selected at least one fiber hole of the first multi-fiber connector; selecting at least one fiber hole of a plurality of fiber holes of a second multi-fiber connector to populate with another optical fiber; selecting not to populate at least one fiber hole of the plurality of fiber holes of the second multi-fiber connector with another optical fiber such that only a portion of the plurality of fiber holes of the second multi-fiber connector are populated with another at least one optical fiber and a remaining portion of the plurality of fiber holes of the second multi-fiber connector are not populated, inserting the another at least one optical fiber in only the selected at least one fiber hole of the second multi-fiber connector; inserting the first multi-fiber connector into a first receptacle of an adapter; and inserting the second multi-fiber connector into a second receptacle of the adapter such that the at least one optical fiber of the first multi-fiber connector and the another at least one optical fiber of the second multi-fiber connector mate in coaxial alignment to effect an interconnection. When a proper connection is formed, the first multi-fiber connector and the second multi-fiber connector have a matching configuration of populated fiber holes and unpopulated fiber holes.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1A:
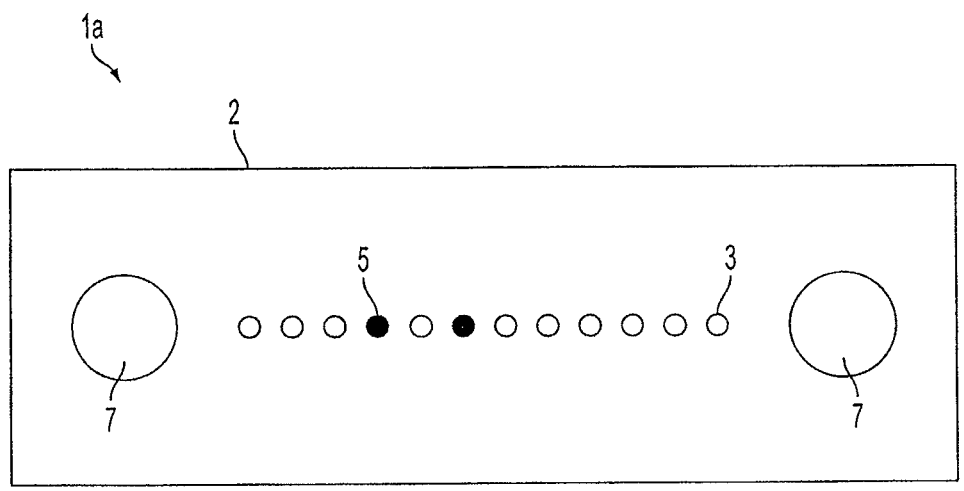
FIG. 1A illustrates a multi-position ferrule of a multi-fiber connector according to an exemplary embodiment of the present invention.

Exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts may be omitted for clarity, and like reference numerals refer to like elements throughout.

Fiber optic connectors typically interconnect a pair of optical fibers aligned in an end-to-end disposition to provide optical transmission therebetween. In a multi-fiber connector, two or more optical fibers may be contained within a single jacket. To interconnect such a multi-fiber optical cable, each fiber within the multi-fiber optical cable is secured to a respective connector. When multiple pairs of fiber optic connectors are to be connected, the fiber optic connectors require mutual alignment of respective fiber cores in a repeatable, separable interconnect.

According to an exemplary embodiment of the present invention, a ferrule is used together with the connector that connects the fiber cable either to another cable, to a transmitter or to a receiver. The ferrule keeps the optical fibers in a fixed position and accurately aligned within the connector. For example, an optical fiber may be inserted into a fiber hole of the ferrule, and fixed thereto by an adhesive. Additional optical fibers may be inserted into one of the remaining available fiber holes.

An end face of the optical fibers may be finished to be flush with or slightly protruding from an end face of the ferrule. The optical fibers held by the ferrule, particularly the fiber end faces, may be polished with a mirror finish. When complimentary ferrules are adjoined, typically in an abutting relationship, two optical fibers mate in coaxial alignment to effect an interconnection. Accordingly, optically encoded information carried in the core of the optical fibers can be transmitted therebetween.

A Mechanical Transfer (MT) ferrule is one type of multi-fiber ferrule, and may be used to simultaneously connect multiple optical fibers using multiple fiber holes. Each fiber hole receives one optical fiber and fiber alignment is dependent on the arrangement of the fiber holes. The arrangement of the fiber holes can made in various patterns which may include two or more fiber holes. The arrangement of the fiber holes may also vary according to a pitch between holes and a hole diameter, however, the exemplary embodiments are not limited to any particular arrangement so long as two mating ferrules have a matching arrangement.

FIG. 1A illustrates a 12-hole MT ferrule 1a as an example of part of a multi-fiber connector according to an exemplary embodiment of the present invention. Ferrule 1a includes a body 2 in which a plurality of fiber holes 3 are formed therethrough and extend in a longitudinal direction. Each of the fiber holes 3 is capable of being populated with an optical fiber 5 of a multi-fiber optical cable. In addition, the ferrule 1a includes guide-pin holes 7 formed in the body 2 and which are aligned with and receive guide-pins of another ferrule, a light emitting or receiving device.

According to the ferrule 1a shown in FIG. 1A, only a portion of the fiber holes 3 available are selected to be populated with an optical fiber 5. In particular, hole #4 and hole #6 from the left are populated with optical fibers of the multi-optical cable. The remaining fiber holes are left empty. Accordingly, only another ferrule having a matching configuration of populated fiber holes 3 will be able to form a proper connection with ferrule 1a of FIG. 1A. In this example, another ferrule having holes #4 and 6 populated with optical fibers will be able to form a proper connection with ferrule 1a. On the other hand, a ferrule populated with fibers in holes #1 and 2 will not be able to form a proper connection with ferrule 1a.

Figure 1B:
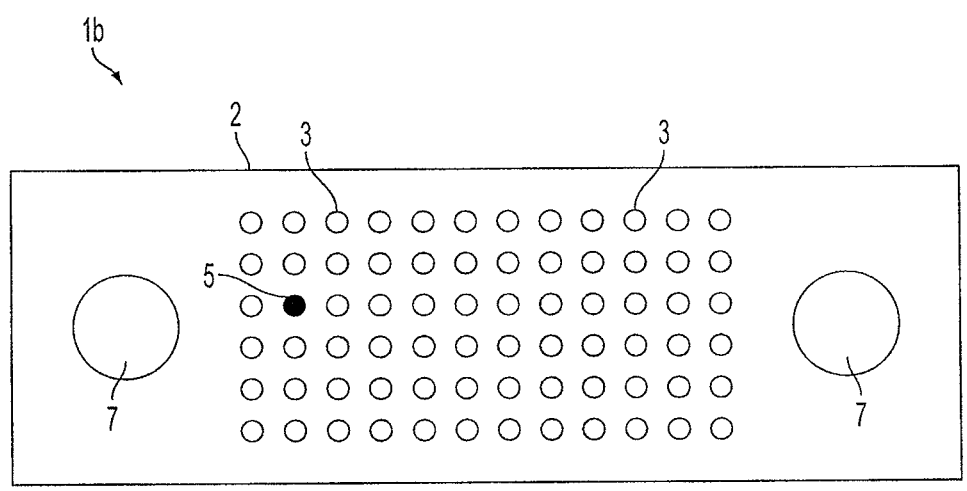
FIG. 1B illustrates a multi-position ferrule of a multi-fiber connector according to another exemplary embodiment of the present invention.

FIG. 1B illustrates a 72-hole MT ferrule 1b as another example of part of a multi-fiber connector according to an exemplary embodiment of the present invention. Ferrule 1b includes 72 fiber holes 3 arranged in 6 rows of 12. Hole #2 from the left in the third row is populated with an optical fiber of a multi-fiber optical cable. The other 71 holes are left empty. Thus, only another ferrule that has a fiber populated in the same manner can form a proper connection with ferrule 1*b*.

Accordingly, through predetermined positioning of optical fibers in a multi-position ferrule within a connector, a secured network connection can be formed between two mating connectors. This is because two mating connectors, held together on separate sides of an adapter, will only have physically connecting optical fibers if the fibers on both connectors have matching positions. Thus, the information transfer through the mating pair(s) of optical fibers is secured since an incoming connector to an adapter, that already has a connectors on its other end, is prevented from making a physical connection between a pair or pairs of optical fibers, unless the positioning of the optical fibers within the connectors are matched.

Figure 2:
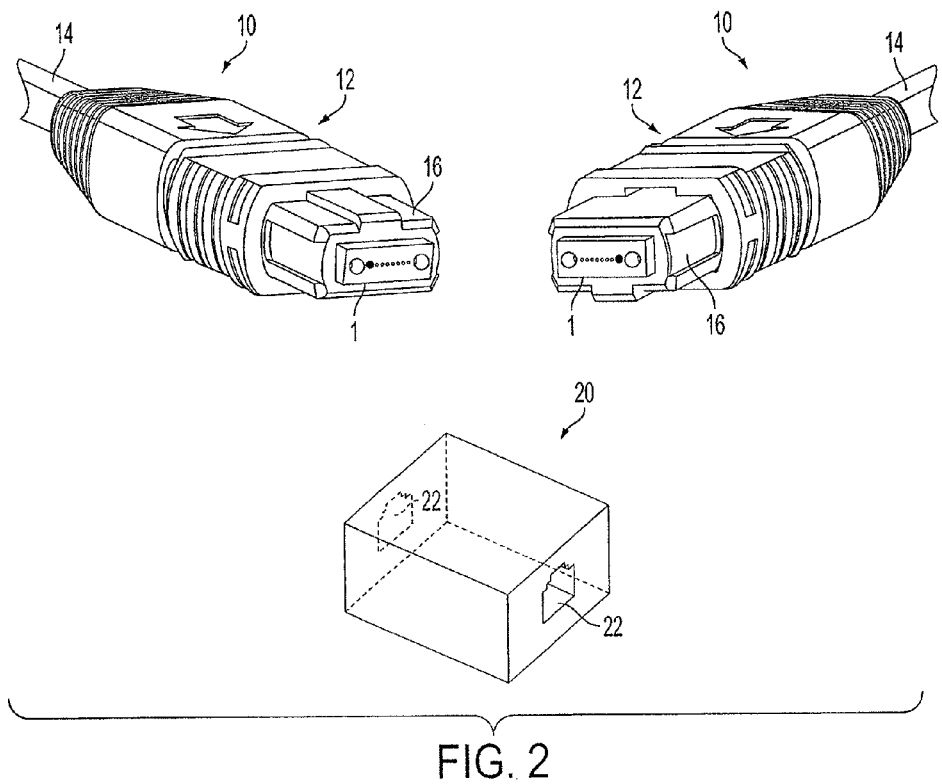
FIG. 2 illustrates a connecting system according to an exemplary embodiment of the present invention.

FIG. 2 illustrates a connecting system according to an exemplary embodiment of the present invention. In particular, FIG. 2 shows matching fiber positions in a pair of connector plugs, which mate in a key-up-to-key-down configuration. The connecting system includes two cable assemblies 10 terminated with a connector plug 12 on each end section of an optical cable 14. Each connector plug 12 includes a housing 16 and a multi-fiber ferrule 1 disposed within the housing 16. The connecting system also includes an adapter 20 which has two receptacles 22 on either side, each receptacle 22 receiving one of the connector plugs 12. Accordingly, a pair of connector plugs 12 are held together by the adapter 20.

As shown in FIG. 2, the positioning of the optical fibers 5 among the plurality of fiber holes 3 in the two connector plugs 12 mirror each other such that the optical fibers 5 in the two mating connector plugs 12 have a corresponding matching position that compliments each other. Because the connector plugs 12 shown in FIG. 2 have a matching positioning of optical fibers disposed within ferrules 1, a proper connection between the connector plugs can be achieved when the two connector plugs 12 are connected by the adapter 20. Thus, by using a predetermined and distinctive selection of positions among a plurality of possible fiber hole positions, security in the connecting system can be ensured.

The number of combinations and permutations achievable by the connection system is dependent on the number of available fiber positions on the multi-fiber ferrule 1 and the number of optical fibers needed for the specific connecting system.

Accordingly, the need to have different connector housings with different physical barriers to prevent either unauthorized insertion of a connector plug into the receptacle of an adapter or unauthorized removal of a connector plug from an adapter can be eliminated. That is, a common connector housing can be used for all connector plugs. In addition, one common adapter may be used to connect the connector plugs.

Identification of connector plugs with specific fiber positioning can be carried out through color-coding the components of the connector plugs, such as plug housings or connector plug boots. Identification of connector plugs with specific fiber positioning can also be carried out through number coding of the cable assemblies, or other types of marking.

Figure 3:
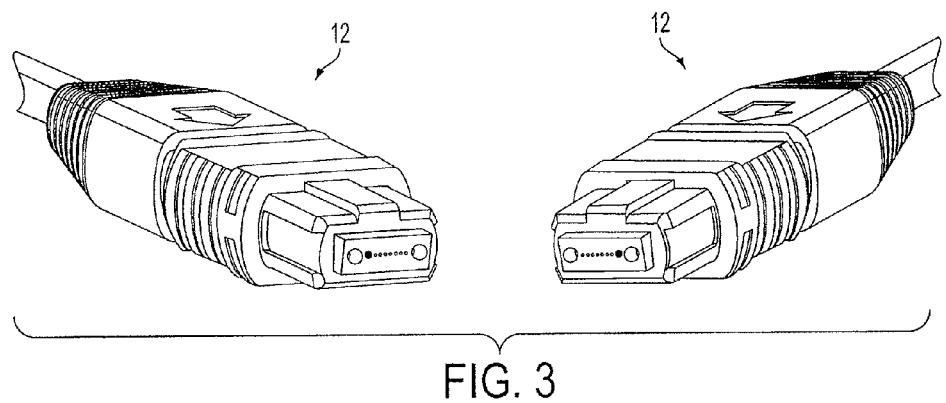
FIG. 3 shows matching fiber positions in a pair of connector plugs, mating in a key-up-to-key-up configuration according to another exemplary embodiment.

FIG. 3 shows matching fiber positions in a pair of connector plugs 12, mating in a key-up-to-key-up configuration according to another exemplary embodiment.

Figure 4:
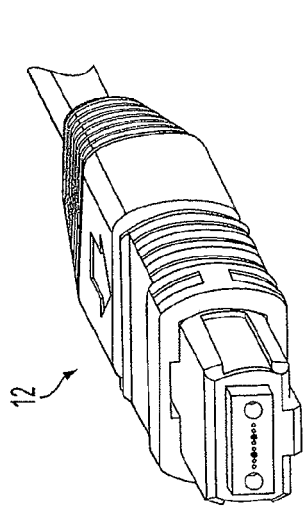
FIG. 4 shows two pairs of matching fiber positions in a pair of connector plugs, mating in a key-up-to-key-down configuration according to another exemplary embodiment.
Figure 4:
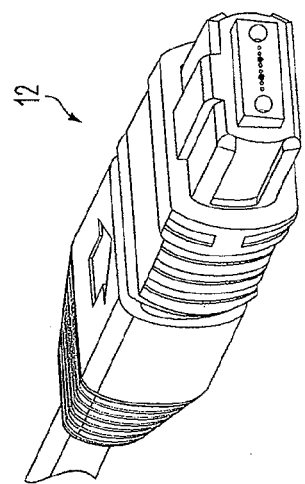

FIG. 4 shows two pairs of matching fiber positions in a pair of connector plugs 12, mating in a key-up-to-key-down configuration according to another exemplary embodiment.

Figure 5:
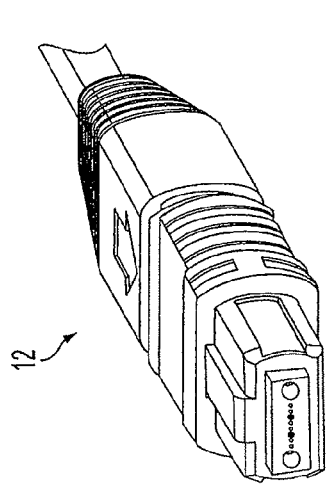
FIG. 5 shows two pairs of matching fiber positions in a pair of connector plugs, mating in a key-up-to-key-up configuration according to another exemplary embodiment.
Figure 5:
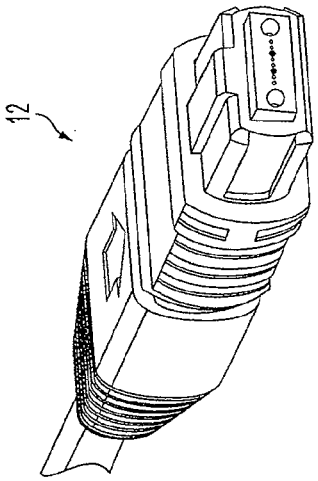

FIG. 5 shows two pairs of matching fiber positions in a pair of connector plugs 12, mating in a key-up-to-key-up configuration according to another exemplary embodiment.

Figure 6:
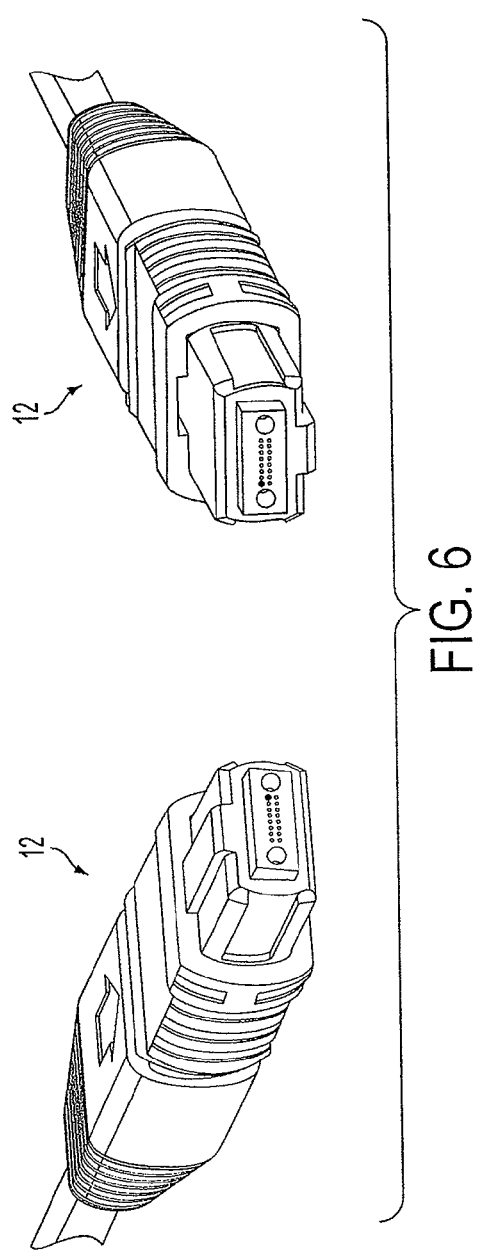
FIG. 6 shows matching fiber positions in a pair of connector plugs with two rows of possible fiber positions, mating in a key-up-to-key-down configuration according to another exemplary embodiment.

FIG. 6 shows matching fiber positions in a pair of connector plugs 12 with two rows of possible fiber positions, mating in a key-up-to-key-down configuration according to another exemplary embodiment.

Figure 7:
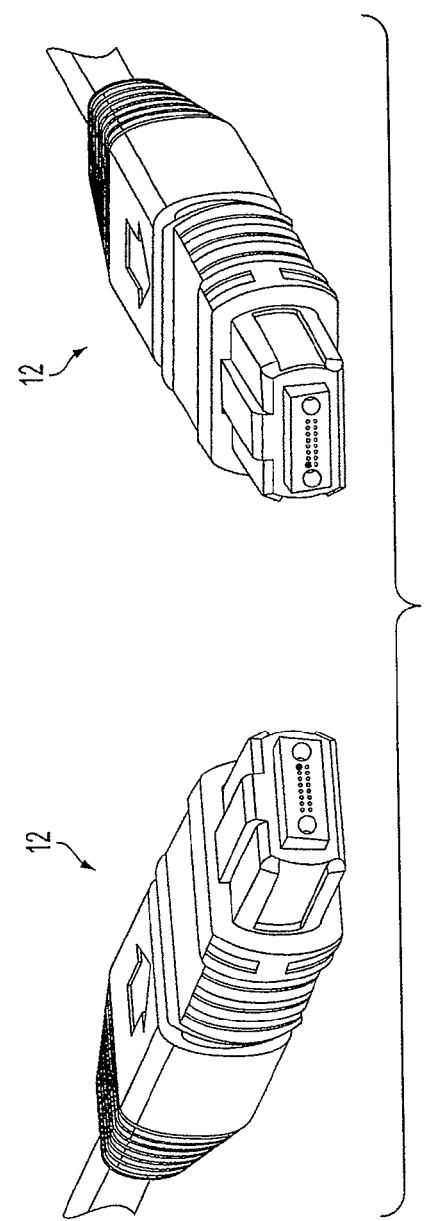
FIG. 7 shows matching fiber positions in a pair of connector plugs with two rows of possible fiber positions, mating in a key-up-to-key-up configuration according to another exemplary embodiment.

FIG. 7 shows matching fiber positions in a pair of connector plugs 12 with two rows of possible fiber positions, mating in a key-up-to-key-up configuration according to another exemplary embodiment.

Figure 8:
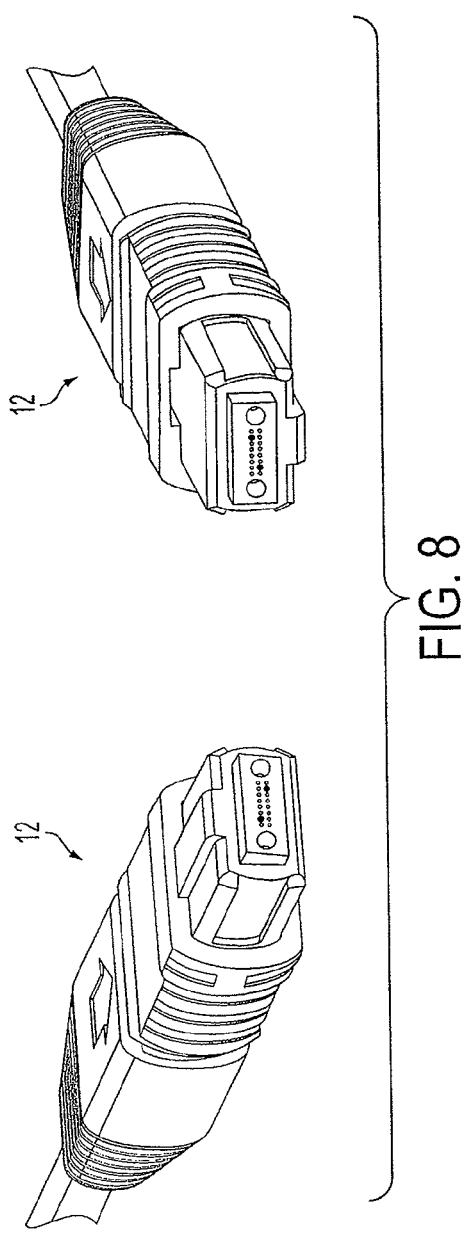
FIG. 8 shows two pairs of matching fiber positions in a pair of connector plugs, mating in a key-up-to-key-down configuration according to another exemplary embodiment.

FIG. 8 shows two pairs of matching fiber positions in a pair of connector plugs 12, mating in a key-up-to-key-down configuration according to another exemplary embodiment.

Figure 9:
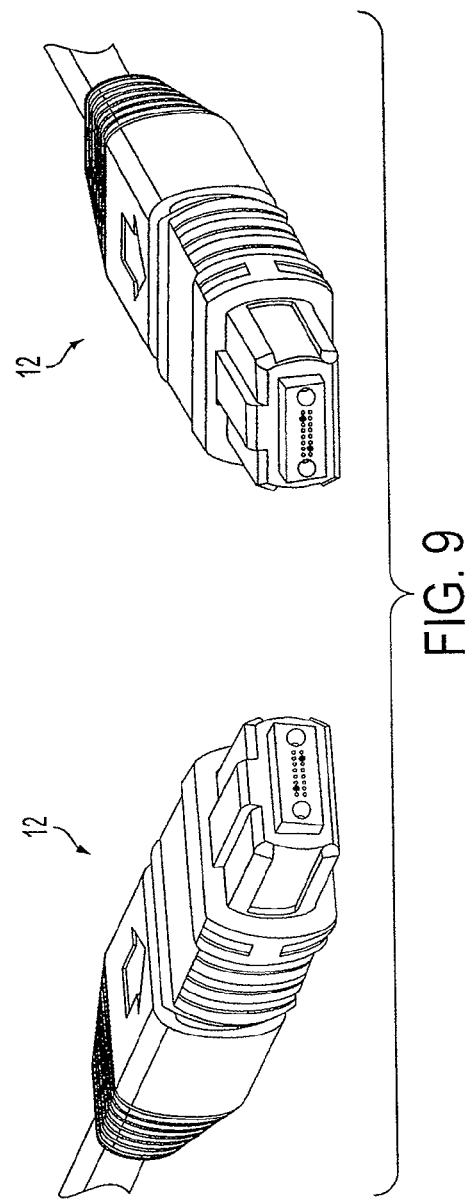
FIG. 9 shows two pairs of matching fiber positions in a pair of connector plugs, mating in a key-up-to-key-up configuration according to another exemplary embodiment.

FIG. 9 shows two pairs of matching fiber positions in a pair of connector plugs 12, mating in a key-up-to-key-up configuration according to another exemplary embodiment.

Accordingly, the exemplary embodiments uses the plurality of fiber holes feature of a multi-fiber ferrule to achieve physical security in the connecting system of a network. By choosing different discrete positions of a multi-fiber ferrule, proper connection can only be made if the mating pair of connectors both have fibers in the position(s) that complement each other.

Although a few exemplary embodiments have been shown and described, it will be appreciated by those skilled in the art that changes may be made in these exemplary embodiments without departing from the principles and spirit of the invention, the scope of which is defined in the appended claims and their equivalents. For example, although the above exemplary embodiments utilize optical fibers, non-optical fibers could also be used without departing from the principles and spirit of the invention.

What is claimed is:

1. A multi-fiber connecter comprising:
   a housing;
   a multi-position ferrule disposed within the housing, the multi-position ferrule including a plurality of fiber holes arranged in a predetermined pattern; and
   at least one fiber, wherein each of the plurality of fiber holes is configured to receive one of the least one fiber and each fiber is selectively inserted within one of the plurality of fiber holes at a selected position among the plurality of fiber holes,
   wherein only a portion of the plurality of fiber holes are populated with the at least one fiber and a remaining portion of the plurality of fiber holes are not populated.

2. The multi-fiber connector of claim 1, wherein each of the at least one fiber is an optical fiber.

3. The multi-fiber connector of claim 1, wherein the at least one fiber includes only one fiber.

4. The multi-fiber connector of claim 1, wherein the at least one fiber includes at least two fibers.

5. The multi-fiber connector of claim 1, wherein at least one of the plurality of fiber holes is not populated with the at least one fiber.

6. A multi-fiber connector system comprising:
   a first multi-fiber connector which comprises:
      a housing;
      a multi-position ferrule disposed within the housing, the multi-position ferrule including a plurality of fiber holes arranged in a predetermined pattern; and
      at least one fiber, wherein each of the plurality of fiber holes is configured to receive one of the at least one fiber and each fiber is selectively inserted within one of the plurality of fiber holes at a selected position among the plurality of fiber holes, wherein only a portion of the plurality of fiber holes are populated with the at least one fiber and a remaining portion of plurality of fiber holes are not populated; and a second multi-fiber connector which comprises:
a housing;
a multi-position ferrule disposed within the housing, the multi-position ferrule including a plurality of fiber holes arranged in a predetermined pattern having matching positions corresponding to the predetermined pattern of the first multi-fiber connector; and
a least one fiber, wherein each of the plurality of fiber holes is configured to receive one of the at least one fiber and each fiber is selectively inserted within one of the plurality of fiber holes at a selected position among the plurality of fiber holes,
wherein the plurality of fiber holes are populated with the at least one fiber such that the first multi-fiber connector and the second multi-fiber connector have a matching configuration of populated fiber holes and unpopulated fiber holes.

7. The multi-fiber connector system of claim 6, wherein each of the at least one fiber is an optical fiber.

8. The multi-fiber connector system of claim 6, further comprising an adapter which comprises a first receptacle configured to receive the first multi-fiber connector and a second receptacle configured to receive the second multi-fiber connector, wherein the at least one fiber of the first multi-fiber connector and the at least one fiber of the second multi-fiber connector mate in coaxial alignment to effect an interconnection.

9. A method of connecting multi-fiber connectors in a secure fiber network, the method comprising:
selecting at least one fiber hole of a plurality of fiber holes of a first multi-fiber connector to populate with a fiber, wherein each of the plurality of fiber holes is configured to receive said fiber;
selecting not to populate at least one fiber hole of the plurality of fiber holes of the first multi-fiber connector with another fiber such that only a portion of the plurality of fiber holes of the first multi-fiber connector are populated with at least one fiber and a remaining portion of the plurality of fiber holes of the first multi-fiber connector are not populated;
inserting at least one fiber in only the selected at least one fiber hole of the first multi-fiber connector;
selecting at least one fiber hole of a plurality of fiber holes of a second multi-fiber connector to populate with another fiber, wherein each of the plurality of fiber holes is configured to receive said other fiber;
selecting not to populate at least one fiber hole of the plurality of fiber holes of the second multi-fiber connector with another fiber such that only a portion of the plurality of fiber holes of the second multi-fiber connector are populated with another at least one fiber and a remaining portion of the plurality of fiber holes of the second multi-fiber connector are not populated,
inserting the another at least one fiber in only the selected at least one fiber hole of the second multi-fiber connector;
inserting the first-multi-fiber connector into a first receptacle of an adapter.

10. The method of connecting multi-fiber connectors in a secure fiber network of claim 9, wherein each of the at least one fiber and each of the another at least one fiber are optical fibers.

11. The method of connecting multi-fiber connectors in a secure fiber network of claim 9, the method further comprising:
inserting the second multi-fiber connector into a second receptacle of the adapter such that the at least one fiber of the first multi-fiber connector and the another at least one fiber of the second multi-fiber connector mate in coaxial alignment to effect an interconnection,
wherein the first multi-fiber connector and the second multi-fiber connector have a matching configuration of populated fiber holes and unpopulated fiber holes.

12. The multi-fiber connector of claim 1, wherein only one of said fiber holes is populated with a fiber.

13. The multi-fiber connector of claim 12, wherein the majority of fiber holes are not populated with fibers.

14. The multi-fiber connector system of claim 6, wherein only one of said fiber holes in each connector is populated with a fiber.

15. The multi-fiber connector of claim 14, wherein the majority of fiber holes in each connector are not populated with fibers.

16. The multi-fiber connector system of claim 6 wherein each of said housings has a key and wherein said keys are configured such that when said connectors are mated, said populated fiber holes and unpopulated fiber holes match with each other.

17. The method of connecting multi-fiber connectors in a secure fiber network of claim 9, wherein only one of said fiber holes in each connector is populated with a fiber.

18. T The method of connecting multi-fiber connectors in a secure fiber network of claim 17, wherein the majority of fiber holes in each connector are not populated with fibers.

* * * * *